United States Patent
Kirsten

[15] 3,676,319
[45] July 11, 1972

[54] ELECTRODE, HALF CELL AND ELECTRODE COMPONENT FOR THE MEASUREMENT OF ELECTROMOTIVE FORCE

[72] Inventor: Jurgen Manfred Kirsten, Horsholm, Denmark

[73] Assignee: Radiometer A/S, Copenhagen, Denmark

[22] Filed: March 28, 1969

[21] Appl. No.: 811,328

[52] U.S. Cl. .................................. 204/195 F, 204/195 S
[51] Int. Cl. ............................................... B01k 3/00
[58] Field of Search............ 204/195 G, 195 S, 195 F, 195 R, 204/195

[56] References Cited

UNITED STATES PATENTS

| | | | |
|---|---|---|---|
| 2,697,070 | 12/1954 | Arthur | 204/195 G |
| 3,190,826 | 6/1965 | Fricke | 204/195 F |
| 3,282,817 | 11/1966 | Riseman et al. | 204/195 G |
| 3,383,299 | 5/1968 | Arthur | 204/195 G |
| 3,455,793 | 7/1969 | Watenabe et al. | 204/195 F |

Primary Examiner—F. C. Edmundson
Attorney—De Lio and Montgomery

[57] ABSTRACT

An electrode, half cell and electrode component for the measurement of electromotive force, wherein during application a conductor surface of a solid metal contacts ions of a sparingly soluble salt of the same metal and ions of a readily soluble salt, the anion of which is identical with the anion of the sparingly soluble salt. By providing sufficient amounts of a solid phase of both kinds of salts, such that the solid phase of both salts is still present in the electrode component or half cell at the maximum operating temperature, the solution contacting the conductor surface is saturated with respect to both types of salts at any operating temperature, whereby temperature hysteresis is avoided.

25 Claims, 7 Drawing Figures

PATENTED JUL 11 1972 3,676,319

INVENTOR.
Jurgen Manfred Kirsten
BY Dedio and Montgomery
ATTORNEYS

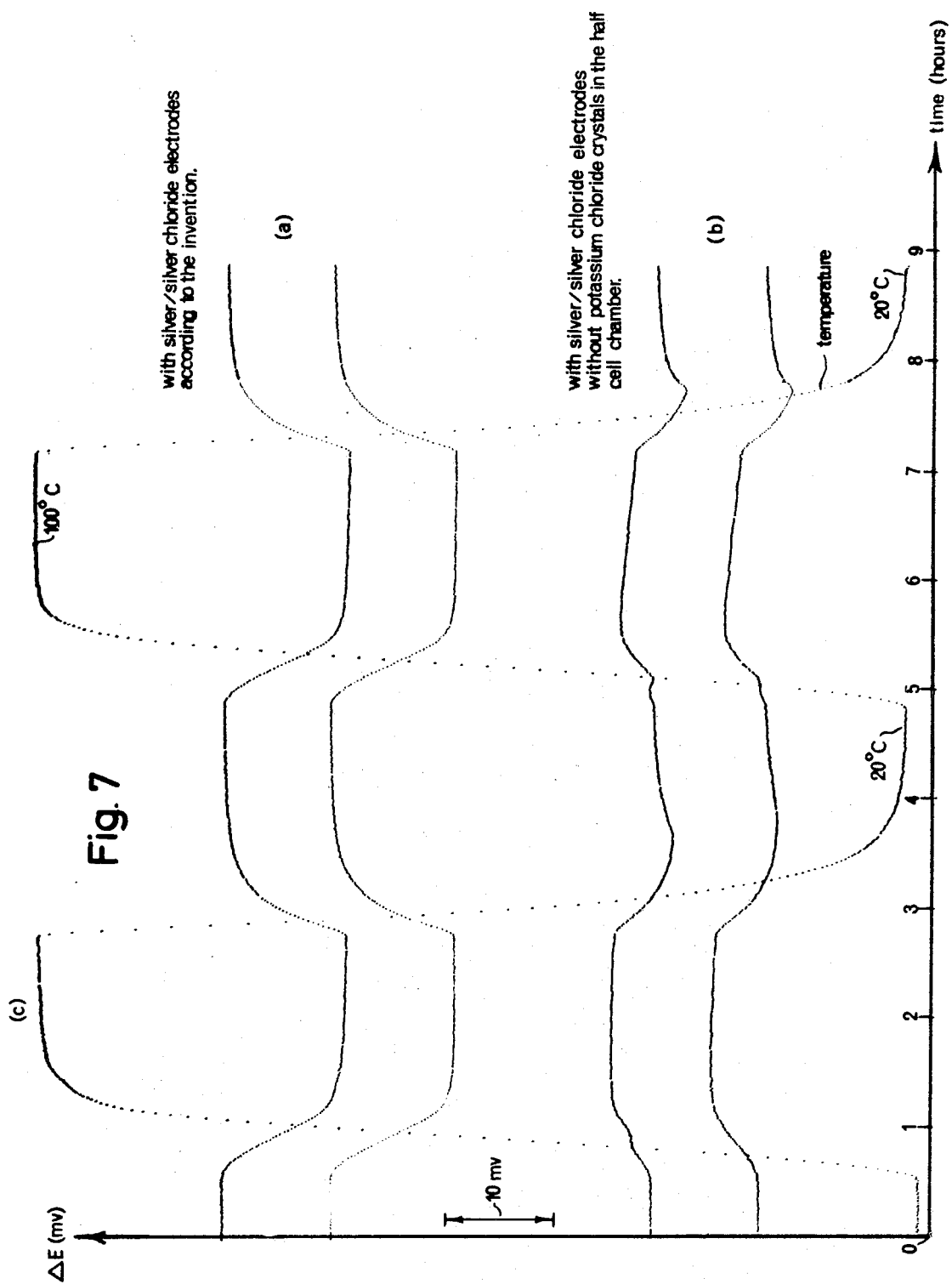

ELECTRODE, HALF CELL AND ELECTRODE COMPONENT FOR THE MEASUREMENT OF ELECTROMOTIVE FORCE

This invention relates generally to electrodes, half cells and electrode components for use in measuring electromotive force for determining ionic activity and redox potentials, more particularly to such electrodes, half cells and electrode components wherein during application a solid metal and a sparingly soluble salt of the metal in a salt solution cooperate to produce en electromotive force.

Half cells of this type are widely used both in reference electrodes and in specific ion electrodes, for example for determining pH values. These half cells are usually silver/silver halide half cells, that is, half cells wherein the solid metal is silver, which cooperates with a silver halide, usually silver chloride, in a solution of an alkali metal halide, the anion of which is identical with the anion of the silver halide, usually silver chloride.

Another half cell is the classical $Hg/Hg_2Cl_2$ half cell. Although this is not a half cell of the above type, as it does not comprise a solid metal, it deserves mentioning because of its widespread use, especially in reference electrodes.

Certain disadvantages of the known half cell systems have limited their field of application considerably.

Thus, the $Hg/Hg_2Cl_2$ half cell is usable only up to a temperature of approximately 80° C., and even then only under conditions where pronounced temperature fluctuations do not occur, as such temperature fluctuations will give rise to severe hysteresis phenomena, so that exact measurements cannot be made. (In this context "hysteresis" is said to occur when, during temperature cycling under otherwise fixed conditions, the potential value measured at a given temperature is not only dependent on the temperature, but also dependent on the history of the temperature changes, so that one and the same potential value will not always be generated at one and the same temperature.)

A known type of silver/silver halide half cell contains a silver conductor which has been coated with a silver halide, either by electrolytical deposition or by immersion into a bath of molten silver halide.

The silver/silver halide half cells containing such an electrolytically coated silver conductor function well in cases where the alkali metal halide solution is a dilute solution. However, controlling the concentration of a dilute alkali metal halide solution is difficult and requires constant supervision. This type of half cell does not function well in cases where the alkali metal halide solution is saturated or highly concentrated. In this case, even brief heating of the electrode would cause the silver halide to dissolve from the silver conductor and thereby destroy the electrode.

Half cells containing a silver conductor which has been coated with silver halide by immersion into a bath of molten silver halide suffer from the same disadvantages as the above-mentioned half cells containing an electrolytically coated silver conductor. They will, moreover, generally produce only a very unstable potential, and in addition to this they exhibit an undesirably high electric resistance when the entire silver conductor is coated with a layer of silver halide.

Also known are electrodes containing as half cell a capsule into which extends a silver conductor which is surrounded by a mixture of alkali metal halide solution, silver metal and solid silver halide, or of alkali metal halide solution and silver halide crystals which have been reduced on their surfaces. Other constructions are half cell systems of this type wherein the silver conductor is surrounded by a mixture of unreduced silver halide crystals and alkali metal halide solution. Further known half cells contain an electrode component consisting of a unitary body formed by a mixture of silver metal and silver halide immersed in an alkali metal halide solution. Electrodes containing half cells of these types will, however, exhibit increasing hysteresis with increasing changes of temperature, when the salt bridge electrolyte solution is a saturated solution.

It may be assumed that such hysteresis phenomena are due to polarization and diffusion resulting from delayed crystallization and dissolution of the electrolyte. If, as a consequence hereof, an unsaturated electrolyte is used instead, this will lead to the above-mentioned difficulties in controlling the concentration of the electrolyte solution with the concomitant necessity of constant supervision.

Furthermore, it should be noted that all the above known electrodes are subject to a drift in inherent potential with time.

The object of the invention is to provide a half cell which does not suffer from the above disadvantages.

More specifically, an object of the invention is to provide a half cell free of temperature hysteresis.

A further object is to provide a half cell which can be used at elevated temperatures, and which is free of temperature hysteresis at the elevated temperatures.

A still further object is to provide a half cell which is well suited for all types of measurements of ionic activities and redox potentials, and especially also those involving conditions of elevated or varying temperatures.

A still further object is to provide a universally applicable half cell of a simple construction.

Another object is to provide a simple electrode component which may be used under conditions of elevated and varying temperatures, and which is free of temperature hysteresis under such application conditions.

A further object is to provide an electrode which is free of temperature hysteresis, and with which exact and reproducible measurements can be made also under conditions of varying or elevated temperatures.

A still further object is to provide electrodes which are free of drift in inherent potential.

According to the invention, it has been found that the problems of temperature hysteresis are completely avoided when solid phase of the sparingly soluble metal salt as well as the readily soluble salt is provided in such a position in relation to the active surface of the metal conductor and in such an amount that the active surface during operation communicates with a solution which contains solid phase of both the sparingly soluble salt and the readily soluble salt at the maximum operation temperature at which the electrode is intended to be used, whereby the active surface is exposed to a saturated solution of both of said salts at any operation temperature.

Unlike conventional half cells of the type dealt with, which work with a salt solution which either already initially is unsaturated with respect to the readily soluble salt or during operation at temperatures above their preparation temperature, which is usually room temperature, becomes unsaturated with respect to the readily soluble salt, half cells according to the invention work with a salt solution which is saturated with respect to the readily soluble salt at any operation temperature. Expressed in another manner, half cells according to the invention work with a salt solution in which the concentration of readily soluble salt varies as a function of temperature, whereas the concentration of readily soluble salt in the salt solution of unsaturated half cells is substantially constant under conditions of varying temperature. This major difference manifests itself in the fact that the potential generated by unsaturated silver/silver chloride half cells will increase with increasing temperature, whereas the potential generated by saturated silver/silver chloride half cells according to the invention will decrease with increasing temperature. Moreover, the potential generated by a half cell according to the invention varies reversibly with the temperature without hysteresis, so that the invention provides saturated half cells (with the obvious advantages of the saturated system) free of temperature hysteresis. Half cells according to the invention may be used in any type of electrode, for example in reference electrodes, specific ion electrodes, and various types of special combination electrodes. Thus, for example, it is possible to build a symmetrical chain with electrodes according to the invention with the obtainment of all the advantages such a measuring technique offers.

The term "saturated solution" as used in the present specification and claims is intended to cover theoretically saturated solutions as well as solutions in which is present such slight local undersaturation or oversaturation as may possibly occur for very short intervals under or after temperature changes. Such possible small local deviations from theoretical saturation will be of no importance in practice when good communication is secured between conductor surface, solution, and solid phases.

In one of its aspects, the present invention relates to an electrode component comprising:

conductor means of solid metal, solid phase of a sparingly soluble salt of a metal identical with a surface metal of said conductor means, and solid phase of a readily soluble salt, the anion of which is identical with the anion of said sparingly soluble salt, said salts being positioned in relation to the conductor means so as to permit communication between the surface metal of the conductor means and ions of said salts when the electrode component is wetted with a solvent for the salts, the amounts of solid phase of said salts being sufficient to provide solid phase of both salts in the electrode component at the maximum operation temperature at which the electrode is intended to be used, whereby the conductor means during operation communicates with a saturated solution of both of said salts at any operation temperature.

In another aspect, the present invention relates to a half cell which comprises walls of an inert material defining a chamber, a mixture contained in said chamber, and conductor means of solid metal, a surface of said conductor means being exposed to said mixture, which mixture comprises a. solid phase of a sparingly soluble salt of a metal identical with said surface metal exposed to the mixture, b. a saturated solution of said sparingly soluble salt and of a readily soluble salt, the anion of which is identical with the anion of the said sparingly soluble salt, and c. solid phase of said readily soluble salt, the amount of solid phase of as well said sparingly soluble salt as said readily soluble salt in said mixture being sufficient to secure that solid phase of both salts is still present in said chamber at the maximum operation temperature at which the electrode is intended to be used. Furthermore, the half cell comprises means permitting communication between said mixture and a substantially liquid material exterior to said chamber.

In a further aspect, the invention relates to an electrode which comprises a half cell of the above type mounted in a container of an inert material which contains a salt bridge solution, and which has means permitting communication between the salt bridge and an exterior substantially liquid material. The communication means of the vessel may be a diaphragm for example a porous plug, whereby a reference electrode is provided, or a specific ion membrane, whereby a specific ion electrode is provided, for example a glass membrane for the measurement of hydrogen ion activity.

Throughout this specification and claims, the term "inert material" is intended to designate such materials as are inert with respect to the environments and conditions involved. Thus, the inert material should be a non-conductor for electric current and chemically resistant to substances to which said inert material will be exposed. In practice, the inert material will usually be glass, but also various types of plastic materials are suitable for the purpose. In the following description, the inert material will be exemplified as glass.

The surface metal of the conductor means and the sparingly soluble metal salt forming part of the mixture may be any combination of solid metal and sparingly soluble salt thereof, which will cooperate electrochemically to produce an electromotive force.

The combination of silver and silver chloride has been found to be an excellent and generally preferred combination for the electrodes and electrode components of the invention. Other combinations may, however, be used, for example, silver/silver bromide and silver/silver iodide. Further combinations are silver/silver sulfide, bismuth/bismuth fluoride and copper/copper sulfide. While the anion of the readily soluble salt is identical with the anion of the sparingly soluble salt, the cation of the readily soluble salt may be freely chosen so as to best suit with the purpose of the invention. As examples of cations which may be suitable may be mentioned ions of the alkali metals, that is, lithium, sodium, potassium, rubidium, and cesium. In connection with the important combination of silver and silver chloride, the preferred anion is the potassium ion, which, because it has much the same size and hence diffusion rate as the chloride ion, is particularly advantageous for example, from the point of view of minimizing liquid junction potentials in the electrodes.

The solvent medium of the salt solution may be any solvent or solvent combination which is able to solve sufficient amounts of the salts to secure that the electrode will function to produce a measurable electromotive force. The solvent must, therefore, be at least to some extent polar. As examples of usable solvent media may be mentioned water, alcohols, for example methanol, ethanol, and propanol-2, preferably in admixture with at least some amount of water, and mixtures of water and alcohols, aldehydes, ketones, and/or aliphatic or aromatic hydrocarbons. The choice of solvent will depend on the specific end use of the half cell. For a majority of purposes, water will be the preferred solvent medium.

The weight ratio of readily soluble salt to sparingly soluble salt in the electrode component or half cell according to the invention may vary widely, with the limitation that sufficient amounts of solid phase of both types of salts must be present to insure that the solid phase of both types of salts is still present at the maximum operation temperature at which the electrode component or half cell is to be used. With the sparingly soluble salt, for example silver chloride, even the presence of very small amounts thereof at room temperature will secure that crystals thereof are still present at the maximum operation temperature. Accordingly, it will usually be the amounts of readily soluble salt, for example potassium chloride, that determine the upper temperature limit at which the electrode component or half cell will function without temperature hysteresis, and experiments have shown that there is close correspondence between the theoretically calculated amount of potassium chloride which will just provide the presence of solid phase at a given upper temperature and the amount thereof which will in practice insure proper hysteresis-free electrode function up to and including this upper temperature. To provide the best possible communication and contact between the components in the chamber of a half cell according to the invention it is generally preferred that the mixture contains so large amounts of crystals of both salts that it is in the form of a paste of crystals moistened with the solution. Accordingly, also considerations concerning the formation of a suitable paste which may easily be filled into the chamber generally contribute to the choice of the specific composition of the mixture. As the mixture is usually compressed after being filled into the chamber, with a consequent removal of part of the solution, the rate of compression is also a factor determining the final composition of the mixture in the chamber. If, for example, the mixture or paste in the chamber consists of 76.5 percent by weight of AgCl, 8.5 percent by weight of KCl, and 15.0 percent by weight of $H_2O$, solid phase of KCl will be present up to a temperature of 100° C. At temperatures up to 100° C. a half cell containing this mixture will, therefore, theoretically function as a saturated hysteresis-free half cell, the half cell being, for the purpose of this calculation, considered as constituting a closed system, whereas above 100° C., it will theoretically function as a conventional unsaturated silver/silver chloride half cell. These theoretical calculations have been found to be in close accordance with the results of practical experiments. In practice, it is often preferred that the ratio of potassium chloride to silver chloride in the mixture or paste is greater than 1:10, preferably greater than 1:4, and preferred pastes may comprise 10 – 20 percent by weight of water, 15 – 45 percent by weight of potassium chloride, and 40 – 60 percent by weight of silver chloride. An especially preferred paste comprises approximately 15 percent by weight of water, approximately 35 percent by weight of potassium chloride, and approximately 50 percent by weight of silver chloride. Further considerations which may apply in connection with the choice of the weight ratio of readily soluble salt to sparingly soluble salt or the mixture composition are considerations relating to electrode life time. If, for example, a silver/silver chloride half cell of the invention is to be used in a reference electrode containing as salt bridge solution a saturated potassium chloride solution and possibly solid potassium chloride, but no silver chloride, silver chloride will, due to ion diffusion, constantly leave the half cell through the diaphragm during operation of the electrode, and in such case it will be preferred that the half cell contains a rather large proportion of silver chloride.

For the preparation of a mixture for use in a half cell or electrode component according to the invention, salts of sufficient purity should be used. Excellent results have, for example, been obtained by precipitating silver chloride, which was then filtered off, washed with water, dried, and ground, and thereafter admixed with potassium chloride, whereupon the mixture was moistened with saturated potassium chloride solution to obtain a paste. If desired, a thickening agent, such as agar, may be used in the mixture.

The electrode component according to the invention may have various forms. Any combination of conductor, solid phase of the sparingly soluble salt, and solid phase of the readily soluble salt may be considered an electrode component according to the invention, provided that the said components are arranged in such a manner relative to each other and that the salts are present in such amounts that during operation the conductor surface communicates with a saturated solution of both of the salts at any operation temperature, and that especially, solid phase of both of the salts is still present in the electrode component at the maximum operation temperature. Accordingly, the combination of conductor, crystals of sparingly soluble salt, and crystals of readily soluble salt present in a half cell according to the invention may in itself be considered an electrode component according to the invention. Also a half cell comprising the said components and solution enclosed in a chamber may, according to the definitions used here, be considered an electrode component according to the invention.

Special electrode components according to the invention are electrode components wherein the solid phases of the salts form a coherent unitary body contacting the surface metal of the conductor means. Such electrode components may be prepared by compression or other suitable unifying techniques. For example, the electrode component may consist of a coherent unitary conductor body, for example a metal pin or platelet, at least a surface of which consists of the metal forming part of the electrochemical system, surrounded by and in contact with a compressed body of solid phase of the readily soluble salt and the sparingly soluble salt. Further conductor means consisting of an inert metal such as platinum or another platinum metal may be used for conducting the current from the conductor. In another embodiment, an electrode component formed by compression or other unifying technique may comprise a body of solid phase of the salts and mutually contacting particles of the conductor metal in contact with further conductor means, possibly of an inert metal, for conducting the current generated by the system. Electrode components of the latter type in the form of coherent unitary bodies may be prepared and shipped as dry electrode components which are then, before use, wetted with a solvent for the salts or, preferably, with a saturated solution of the readily soluble salt forming part of the electrode component. The thorough wetting of the electrode component may be performed by filling the interstices of the component with solvent or solution utilizing capillary forces alone or by first generating a vacuum in the electrode component and thereafter applying the solvent or solution. An electrode component in the form of a coherent unitary body of crystals of the two types of salts in contact with an active conductor surface may be used for insertion into a chamber for the formation of a half cell, or it may be used directly as a half cell without being inserted into such a chamber. In such case, the electrode component may be inserted directly into a container containing a communicating electrolyte serving as a salt bridge, the communication with an exterior substantially liquid sample material taking place through suitable means, for example through a diaphragm in the container wall, or through a specific ion membrane. It is highly preferable that the communicating electrolyte in this case is saturated with respect to the readily soluble salt.

In an electrode component or half cell according to the invention, the conductor and the solid phase of the two types of salts may be arranged in various manners in relation to each other, and the conductor may have any suitable shape. Often, the solid phase will be arranged in contact with an outer surface of the conductor, but the conductor may also be shaped so as to define a pocket or capsule in which the solid phase may be positioned. Other suitable conductors in the form of a coherent unitary body may be shaped as a metal fork or network inserted in contact with the solid phase. Alternatively, the conductor may, as mentioned above, consist of a multiplicity of mutually contacting metal particles. It is not necessary that the whole of the conductor consists of the particular metal forming part of the electrochemical system, only the surface thereof in contact with the solution and with the salts need consist of this metal. Accordingly, practical considerations concerning the suitable construction of the half cell or electrode component of the invention may determine the base conductor metal to be used, and the technique to be used for applying a surface of the active metal when the conductor does not consist exclusively of this metal. A combination often used in electrode components and half cells according to the invention is a basis conductor body of platinum onto which a silver surface has been applied, for example electrolytically or by a metal spraying technique. Very often, the further conductor means for conducting the current from the electrode or half cell according to the invention will consist of a metal or metal combination different from the conductor forming part of the electrode component or half cell of the invention. Thus, a combination which will often prove useful is a silver conductor in the electrode component or half cell connected to a platinum conductor for conducting the current from the electrode component or half cell, which platinum conductor may, in turn, be connected to other conductor means, for example, a conductor of an instrument used for reading the potential values generated. If a conductor having a surface of a non-inert metal, for example, of the same metal as forms part of the electrochemical system, is used as further conductor means for conducting the current from the electrode component or half cell, this further conductor means should be shielded effectively electrically and electrolytically from any salt bridge electrolyte (in reference electrodes) or reference solution (in specific ion electrodes).

When the electrode component or half cell of the invention is inserted in a container containing a communicating electrolyte and having means for communication with an exterior liquid material, for example, to form a reference electrode or a specific ion electrode, this electrolyte is preferably saturated with respect to the same readily soluble salt as forms part of the half cell or electrode component. In a preferred embodiment, the communicating electrolyte further contains solid phase of this salt in such an amount that solid phase of the salt will still be present in the communicating electrolyte at the maximum operation temperature at which the electrode is intended to be used. This offers the advantage that the whole electrode system will be saturated with respect to the readily soluble salt at any operation temperature, so that the electrode life time will not be decreased due to removal of readily soluble salt from the electrode component or half cell. In a further preferred embodiment, the communicating electrolyte also contains solid phase of the sparingly soluble salt, whereby the risk of removal of sparingly soluble salt from the electrode component or electrode during operation is minimized. In cases where the communicating electrolyte contains solid phase of either one or both of the salts, this solid phase should preferably be so positioned that it contacts the communication means of the electrode component or half cell (which communication means is the electrode component exterior in case of an electrode component in the form of a unitary porous body serving as half cell).

The objects and advantages of the invention will be more fully understood from the following description taken in connection with the accompanying drawing, wherein:

FIG. 7 shows graphs of the electrode potential as a function of electrode temperature for reference electrodes according to the invention and for known reference electrodes, respectively.

In the drawing, like reference numbers designate like elements.

Figure 1:
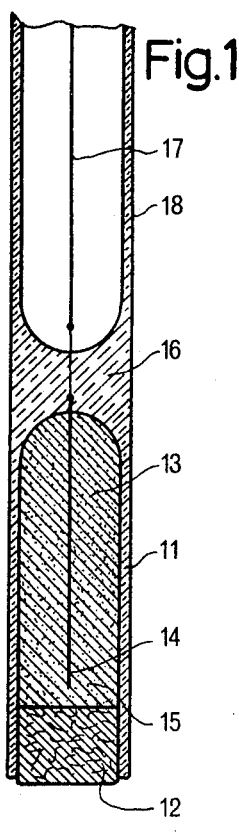
FIG. 1 shows a part sectional view in enlarged scale of a preferred embodiment of an electrode component or half cell according to the invention.

The electrode component or half cell shown in FIG. 1 has glass walls 11 defining a chamber 13 having an open end which is closed by a porous plug 12, e.g. of cotton wool or glass wool constituting a diaphragm. The chamber 13 contains a conductor 14 having a silver surface. This conductor may, for example, be a silver pin or platelet or a platinum pin or platelet coated with silver. The conductor 14 is surrounded by a mixture 15 comprising silver chloride crystals, potassium chloride crystals, and a saturated aqueous solution of silver chloride and potassium chloride. A thin wire 17 passing through a wall part 16 is connected to the conductor 14. The free end part of the wire 17 is shielded by tubular glass walls 18. The wire 17 may be of any suitable metal which is a conductor for an electric current.

Figure 2:
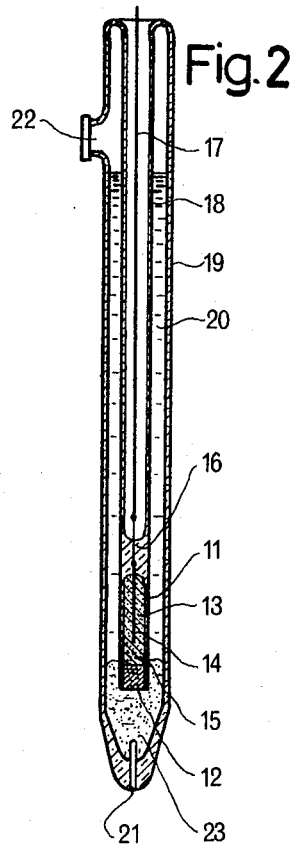
FIG. 2 shows a sectional view of a preferred embodiment of a reference electrode according to the invention.

In FIG. 2 a reference electrode according to the invention is shown. This reference electrode comprises an electrode component or half cell of the type described above and shown in FIG. 1 arranged in a glass container 19 in a conventional manner. The container 19 contains a saturated aqueous solution 20 of potassium chloride serving as salt bridge electrolyte. A porous plug 21, e.g. of glass, a ceramic material or asbestos, placed in an opening at the bottom of the container 19 serves as diaphragm. The potassium chloride solution 20 contains solid potassium chloride crystals 23 being present in such an amount that they contact the bottom end of the porous plug 12 under all operation temperature conditions. Potassium chloride solution and potassium chloride crystals may be afterfilled through an opening 22.

Figure 3:
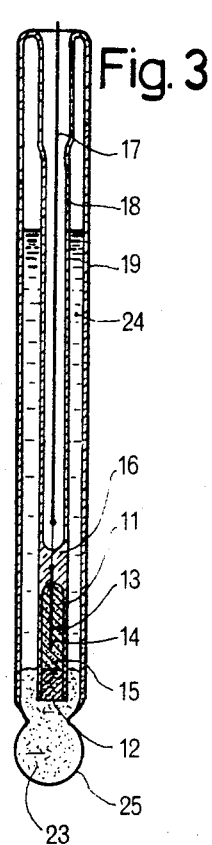
FIG. 3 shows a sectional view of a preferred embodiment of a specific ion electrode according to the invention.

FIG. 3 shows a specific ion electrode which corresponds to the electrode shown in FIG. 2 with the exception that the bottom of the container 19 is a specific ion membrane 25. Furthermore, in FIG. 3 the solution 20 in the container 19 of FIG. 2 is replaced by a reference electrolyte 24. The specific ion membrane 25, e.g. a glass membrane for measuring hydrogen ion activity, permits communication between the reference electrolyte 24 and a liquid sample (not shown in the drawings) when the bottom part of the container 19 is immersed in the same.

Figure 4:
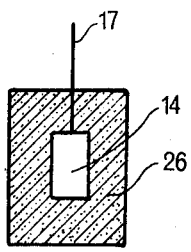
FIGS. 4 and 5 show sectional views in enlarged scale of further embodiments of electrode components according to the invention.

In the electrode component shown in FIG. 4, the conductor 14, at least the surface of which consists of silver, is surrounded by and in contact with a compressed porous body 26 comprising silver chloride crystals and potassium chloride crystals. The wire 17 is of an inert metal, e.g. platinum or a platinum metal.

Figure 5:
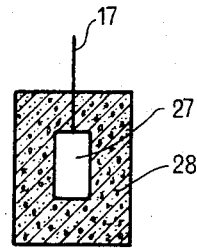

The electrode component shown in FIG. 5 contains a plate 27 of platinum or another inert metal, e.g., another platinum metal, surrounded by and in contact with a compressed porous body 28 comprising silver metal particles, silver chloride crystals and potassium chloride crystals, the silver metal particles being present in such an amount that they mutually contact each other. In this embodiment the silver particles serve as the active conductor whereas the plate 27 merely serves to provide electrical contact between the silver particles and the wire 17, which also consists of an inert metal.

Figure 6:
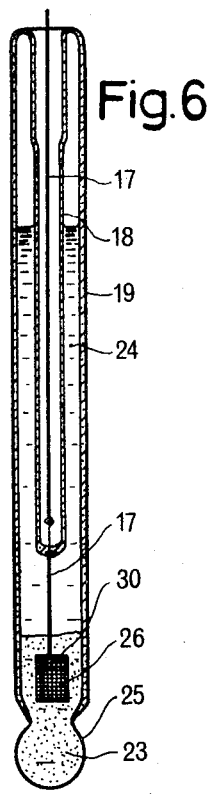
FIG. 6 shows a sectional view of a further specific ion electrode according to the invention containing an electrode component of the same general type as shown in FIG. 4.

The specific ion electrode of FIG. 6 contains an electrode component of the same general type as the electrode component shown in FIG. 4 serving as half cell. The silver conductor shown in FIG. 6 is in the form of a network or grid 30. The electrode component comprising this conductor and the surrounding body 26 is mounted in a container 19 of the type shown in FIG. 3. The wire 17 consists of an inert metal. In this embodiment, the reference electrolyte 24 contains crystals 23 of potassium chloride, preferably in such an amount that the exterior of the electrode component is contacted thereby at any operation temperature.

The graphs of FIG. 7 indicate the variation of electrode potential in response to electrode temperature variation. The measurement results represented by graphs (a) were obtained using two silver/silver chloride electrodes according to the invention and of the type shown in FIG. 2, whereas the results represented by the graphs (b) were obtained using two silver/silver chloride electrodes of similar, but conventional type without potassium chloride crystals in the half cell chamber. As well the electrodes according to the invention as the conventional electrodes used for the measurements contained salt bridges consisting of saturated potassium chloride solution with a surplus of potassium chloride crystals in such an amount that potassium chloride crystals were present in the salt bridge electrolyte in a sufficient amount to cover the porous plug of the half cell electrodes at the maximum test temperature of 100° C. A curve (c) shows the temperature variation as a function of time. The experiment was carried out by varying the temperature as indicated by curve (c) of a salt solution into which the electrodes were immersed, and measuring the potentials generated by the electrodes. All measurements were made against ordinary calomel reference electrodes which were connected to the test electrodes via a salt bridge and thermostated to 20° C. The temperature of the solution into which the temperature electrodes were immersed was measured by means of a thermocouple. All the graphs or curves (a), (b), and (c) were plotted simultaneously by an authomatical multiple curve recorder. It will be noted that the graphs (a) for the electrodes according to the invention show decreasing potential with increasing temperature, whereas the graphs for the conventional electrodes (b) show increasing potential with increasing temperature. It will also be noted that the potentials represented by graphs (a) vary with the temperature in such a manner that one and the same potential value substantially corresponds to one and the same temperature value, i.e., the potential graphs are exactly inverse to the temperature curves (however, with a smaller ordinate scale), whereas the potential curves (b) for the conventional electrodes show several manifestations of hysteresis phenomena.

It will be understood that similar excellent results as obtained in this experiment will be obtained using any electrode or electrode component according to the invention, the condition for the obtainment of potential value variation free of temperature hysteresis being that the active conductor surface at any operation temperature communicates with a solution which is saturated with respect to as well the sparingly soluble salt as the readily soluble salt, which, according to the invention, is obtained by securing that solid phase of as well the sparingly soluble as the readily soluble salt is present at the maximum operation temperature.

In the foregoing specification, the invention has been explained with reference to specific embodiments. It will, however, be understood by those skilled in the art that this explanation should be interpreted as examples rather than in a limiting sense, and that a great number of modifications and variations may be made without departing from the scope of the invention as defined in the appended claims.

What I claim is:

1. An electrode component for measuring electromotive force comprising
   conductor means of solid metal,
   solid phase of a sparingly soluble salt of a metal identical with a surface metal of said conductor means, and
   solid phase of a readily soluble salt, the anion of which is identical with the anion of said sparingly soluble salt,
      said salts being positioned in relation to the conductor means so as to permit communication between the surface metal of the conductor means and ions of said salts when the electrode component is wetted with a solvent for the salts, the amounts of solid phase of said salts being sufficient so that the solid phase of both salts is still present in the electrode component at the maximum operating temperature at which the electrode is intended to be used, whereby the conductor means during operation communicates with a saturated solution of both of said salts at any operating temperature.

2. An electrode component according to claim 1, wherein the surface metal is silver, and the sparingly soluble salt is selected from the group consisting of silver chloride, silver bromide, and silver iodide.

3. An electrode component according to claim 2, wherein the cation of the readily soluble salt is an alkali metal ion.

4. An electrode component according to claim 3, wherein the salt anion is the chloride ion, and the cation of the readily soluble salt is the potassium ion.

5. An electrode component according to claim 1, wherein said solid phases of said salts form a porous coherent unitary body contacting the surface metal of the conductor means.

6. An electrode component according to claim 5, wherein the conductor means is a coherent nonporous body.

7. An electrode component according to claim 5, wherein the conductor means comprise mutually contacting metal particles.

8. An electrode component according to claim 1, further comprising a saturated solution of said salts and walls of an inert material defining a chamber which contains said conductor means and the said solid phases of said salts together with the saturated solution of said salts, said chamber walls having means permitting communication between the chamber contents and a substantially liquid material outside said chamber.

9. A half cell for measuring electromotive force comprising:
   walls of an inert material defining a chamber, a mixture contained in said chamber, and conductor means of solid metal, a surface of said conductor means being exposed to said mixture, which mixture comprises:
   a. solid phase of a sparingly soluble salt of a metal identical with said surface metal exposed to the mixture,
   b. a saturated solution of said sparingly soluble salt and of a readily soluble salt, the anion of which is identical with the anion of the said sparingly soluble salt, and
   c. solid phase of said readily soluble salt, the amount of solid phase of said sparingly soluble salt as well as said readily soluble salt in said mixture being sufficient so that the solid phase of both salts is still present in said chamber at the maximum operating temperature at which the half cell is intended to be used, whereby the surface of said conductor means during operation communicates with a saturated solution of both of said salts at any operating temperature, and further comprising means permitting communication between said mixture and a substantially liquid material exterior to said chamber.

10. A half cell according to claim 9, wherein the saturated solution is an aqueous solution.

11. A half cell according to claim 10, wherein the conductor surface metal is silver, and the sparingly soluble salt is selected from the group consisting of silver chloride, silver bromide, and silver iodide.

12. A half cell according to claim 11, wherein the cation of the readily soluble salt is an alkali metal ion.

13. A half cell according to claim 12, wherein the salt anion is the chloride anion, and the cation of the readily soluble salt is the potassium ion.

14. A half cell according to claim 13, wherein the weight ratio of potassium chloride to silver chloride is greater than 1:10, preferably greater than 1:4.

15. A half cell according to claim 14, wherein the mixture comprises 10 – 20 percent by weight of water, 15 – 45 percent by weight of potassium chloride, and 40 – 60 percent by weight of silver chloride.

16. A half cell according to claim 15, wherein the mixture comprises approximately 15 percent by weight of water, approximately 35 percent by weight of potassium chloride, and approximately 50 percent by weight of silver chloride.

17. A half cell according to claim 9, wherein said communication means comprise a diaphragm in said chamber walls.

18. An electrode comprising a half cell according to claim 17, a communicating electrolyte contacting said diaphragm and a container for said electrolyte having a wall section permitting communication between the communicating electrolyte and an exterior substantially liquid material.

19. An electrode according to claim 18, wherein the communicating electrolyte contains solid phase of the readily soluble salt in a sufficient amount so that the solid phase of said salt is still present in the electrolyte at the maximum operating temperature at which the electrode is intended to be used.

20. An electrode according to claim 19, wherein the communicating electrolyte further contains solid phase of the sparingly soluble salt in a sufficient amount so that the solid phase of said salt is still present in the electrolyte at the maximum operating temperature at which the electrode is intended to be used.

21. An electrode according to claim 18, wherein the wall section permitting communication between the communicating electrolyte and the exterior substantially liquid material is a diaphragm.

22. An electrode according to claim 18, wherein the wall section permitting communication between the communicating electrolyte and the exterior substantially liquid material is a specific ion membrane.

23. An electrode comprising an electrode component according to claim 1.

24. In a silver/silver halide half cell for the measurement of electromotive force and comprising
   a conductor having a silver surface,
   solid silver halide selected from the group consisting of silver chloride, silver bromide and silver iodide, and
   a solution of said silver halide and of a readily soluble halide, the anion of which is identical with the halide anion of the silver halide,
      said silver surface being exposed to said solid silver halide and said solution,
the improvement that said solution contains solid phase of said readily soluble halide in a sufficient amount so that the solid phase of said halide is still present in the solution at the maximum operating temperature at which the electrode is to be used, whereby the said silver surface communicates with a solution which is saturated with respect to the readily soluble halide at any operating temperature.

25. An electrode for measuring electromotive force and comprising:
   A. a half cell comprising:
      1. conductor means of solid metal
      2. solid phase of a sparingly soluble salt of a metal identical with a surface metal of said conductor means, and
      3. solid phase of a readily soluble salt, the anion of which is identical with the anion of said sparingly soluble salt, said solid phases of said salts forming a porous coherent unitary body contacting the surface metal of the conductor means, and 4. a solution filling the interstices of said porous body and communicating with the surface metal of the conductor means, said solution being saturated with respect to said sparingly soluble salt as well as said readily soluble salt, said salts being positioned in relation to the conductor means and being present in solid phase in such amounts that the solution communicating with the conductor means remains saturated with respect to both of said salts at any operating temperature;

B. a communicating electrolyte contacting said half cell; and

C. a container for said communicating electrolyte, said container having a wall section permitting communication between the communicating electrolyte and an exterior substantially liquid material.

* * * * *